US012218421B2

(12) United States Patent
Badger et al.

(10) Patent No.: US 12,218,421 B2
(45) Date of Patent: Feb. 4, 2025

(54) FIRST AND SECOND LOG-PERIODIC ANTENNA PANELS

(71) Applicant: The Government of the United States, as represented by the Secretary of the Army, Washington, DC (US)

(72) Inventors: Stephen Badger, Ocean Grove, NJ (US); Shuguang Chen, Bel Air, MD (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 145 days.

(21) Appl. No.: 18/118,389

(22) Filed: Mar. 7, 2023

(65) Prior Publication Data

US 2024/0305001 A1 Sep. 12, 2024

(51) Int. Cl.
*H01Q 11/10* (2006.01)
*H01Q 21/08* (2006.01)

(52) U.S. Cl.
CPC ............. *H01Q 11/10* (2013.01); *H01Q 21/08* (2013.01)

(58) Field of Classification Search
CPC ............................... H01Q 11/10; H01Q 21/08
See application file for complete search history.

(56) References Cited

U.S. PATENT DOCUMENTS

2002/0196185 A1* 12/2002 Bloy .................... H01Q 3/2605 342/435
2009/0102705 A1* 4/2009 Obermeyer ......... G01S 13/9029 343/705

* cited by examiner

*Primary Examiner* — Monica C King
(74) *Attorney, Agent, or Firm* — Ronald Krosky

(57) ABSTRACT

Various embodiments relate to antenna panels with different geometries. Two or more log-periodic panels, such as log-periodic antenna panels, can be arranged along about the same plane next to one another. In one example, two panels can be employed, a first panel and a second panel. These panels can have a geometry, with the first panel having a first geometry and the second panel having a second geometry that is a mirror of the first geometry.

20 Claims, 13 Drawing Sheets

530

FIRST AND SECOND LOG-PERIODIC ANTENNA PANELS

GOVERNMENT INTEREST

The innovation described herein may be manufactured, used, imported, sold, and licensed by or for the Government of the United States of America without the payment of any royalty thereon or therefor.

BACKGROUND

Modern communications rely on antennas to communicate wireless signals between devices. A transmitting antenna can broadcast a signal around itself without regard to direction and a receiving antenna can receive the signal. However, using an antenna that is not focused on a specific location can be less effective in some instances and have a less desired outcome.

SUMMARY

In one embodiment, a system can comprise a first log-periodic antenna panel with a first geometry and a second log-periodic antenna panel with a second geometry. The first log-periodic antenna panel and the second log-periodic antenna panel can be arranged along about the same plane next to one another. The first geometry and the second geometry can be different in orientation.

In another embodiment, a system can comprise a first log-periodic antenna panel with a first geometry and a second log-periodic antenna panel with a second geometry. In addition, the system can comprise a first ground plate coupled to the first log-periodic antenna panel that causes the first log-periodic antenna panel to be more directional and a second ground plate coupled to the second log-periodic antenna panel that causes the second log-periodic antenna panel to be more directional. The system can also comprise a first feed coupled to the first log-periodic antenna panel and a second feed coupled to the second log-periodic antenna panel. The system can additionally comprise a management component configured to manage the first feed to be at a normalized 0 degrees and to manage the second feed to be at a 180 degree offset from the first feed. The first log-periodic antenna panel and the second log-periodic antenna panel can be arranged along about the same plane next to one another, with the first geometry and the second geometry do not matching in orientation.

In yet another embodiment, a system can comprise a first log-periodic antenna panel with a first geometry and a second log-periodic antenna panel with a second geometry. In addition, the system can comprise a first ground plate coupled to the first log-periodic antenna panel that causes the first log-periodic antenna panel to be more directional and a second ground plate coupled to the second log-periodic antenna panel that causes the second log-periodic antenna panel to be more directional. The system can also comprise a first feed coupled to the first log-periodic antenna panel and a second feed coupled to the second log-periodic antenna panel. The system can additionally comprise a management component configured to manage the first feed to be at a normalized 0 degrees and to manage the second feed to be at a 180 degree offset from the first feed and a wall. The first log-periodic antenna panel & the second log-periodic antenna panel can form an antenna panel set and the first ground plate & the second ground plate can form a ground plate set. The wall can be disposed between the antenna panel set and the ground plate set to form a cavity and the first log-periodic antenna panel & the second log-periodic antenna panel can be arranged along about the same plane next to one another. The second geometry can be a mirror of the first geometry, with the first geometry having a circular footprint and the second geometry having a circular footprint.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

Figure 1A:
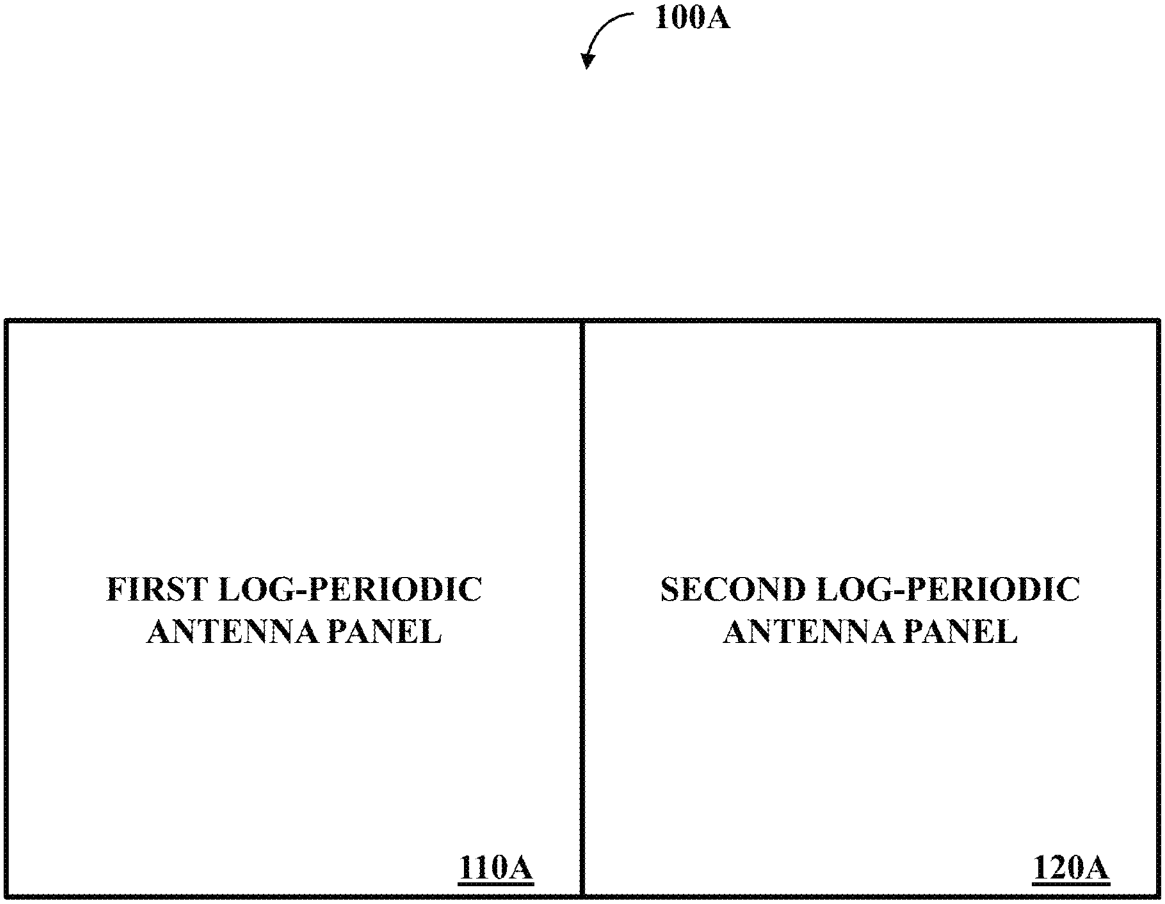
FIG. 1A illustrates one embodiment of a system comprising a first log-periodic antenna panel and a second log-periodic antenna panel.
Figure 1B:
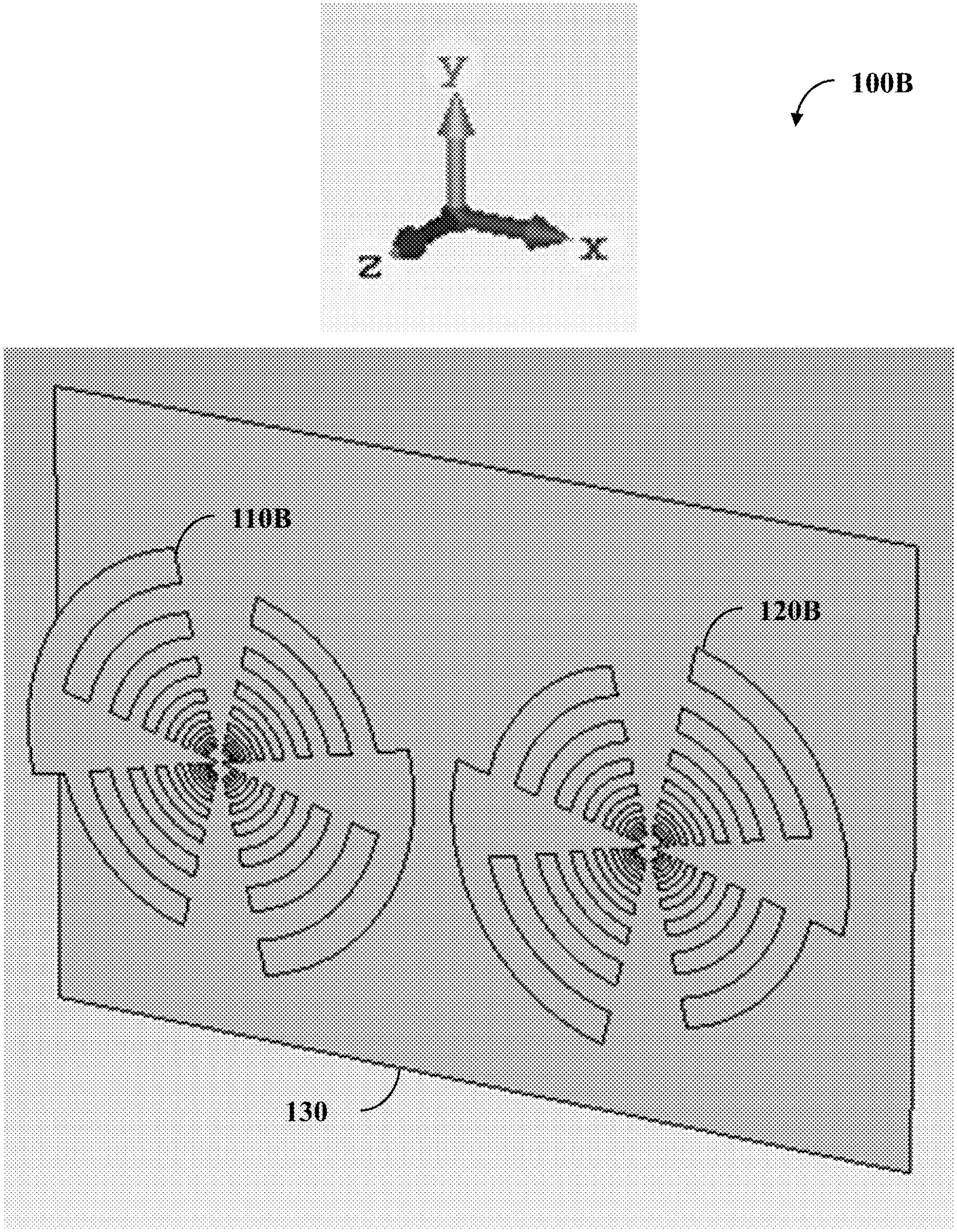
FIG. 1B illustrates one embodiment of a system comprising a first log-periodic antenna panel with a first geometry and a second log-periodic antenna panel with a second geometry backed by a common ground plate.
Figure 1C:
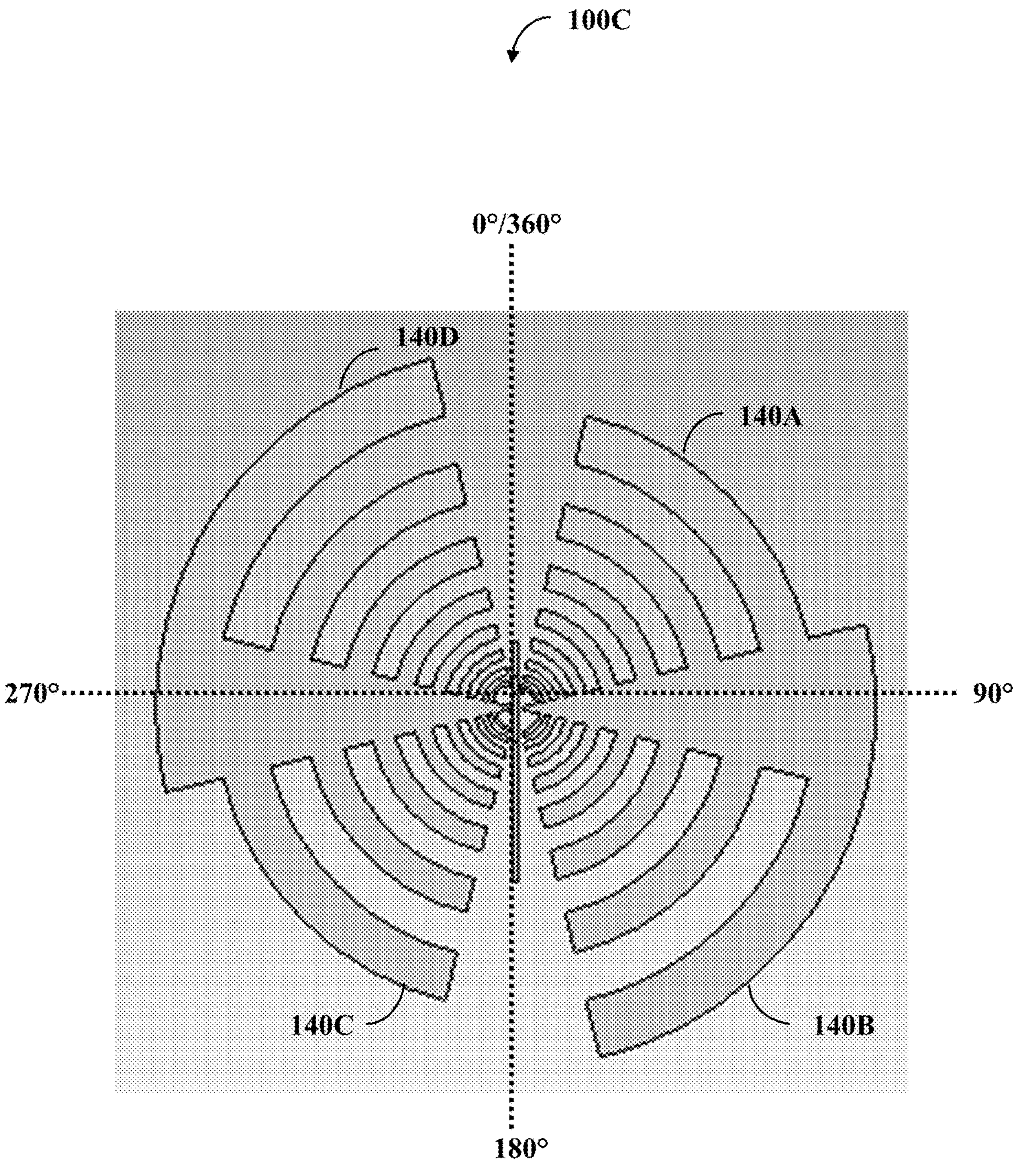
FIG. 1C illustrates one embodiment of an antenna panel with a first arm, a second arm, a third arm, and a fourth arm.
Figure 5A:
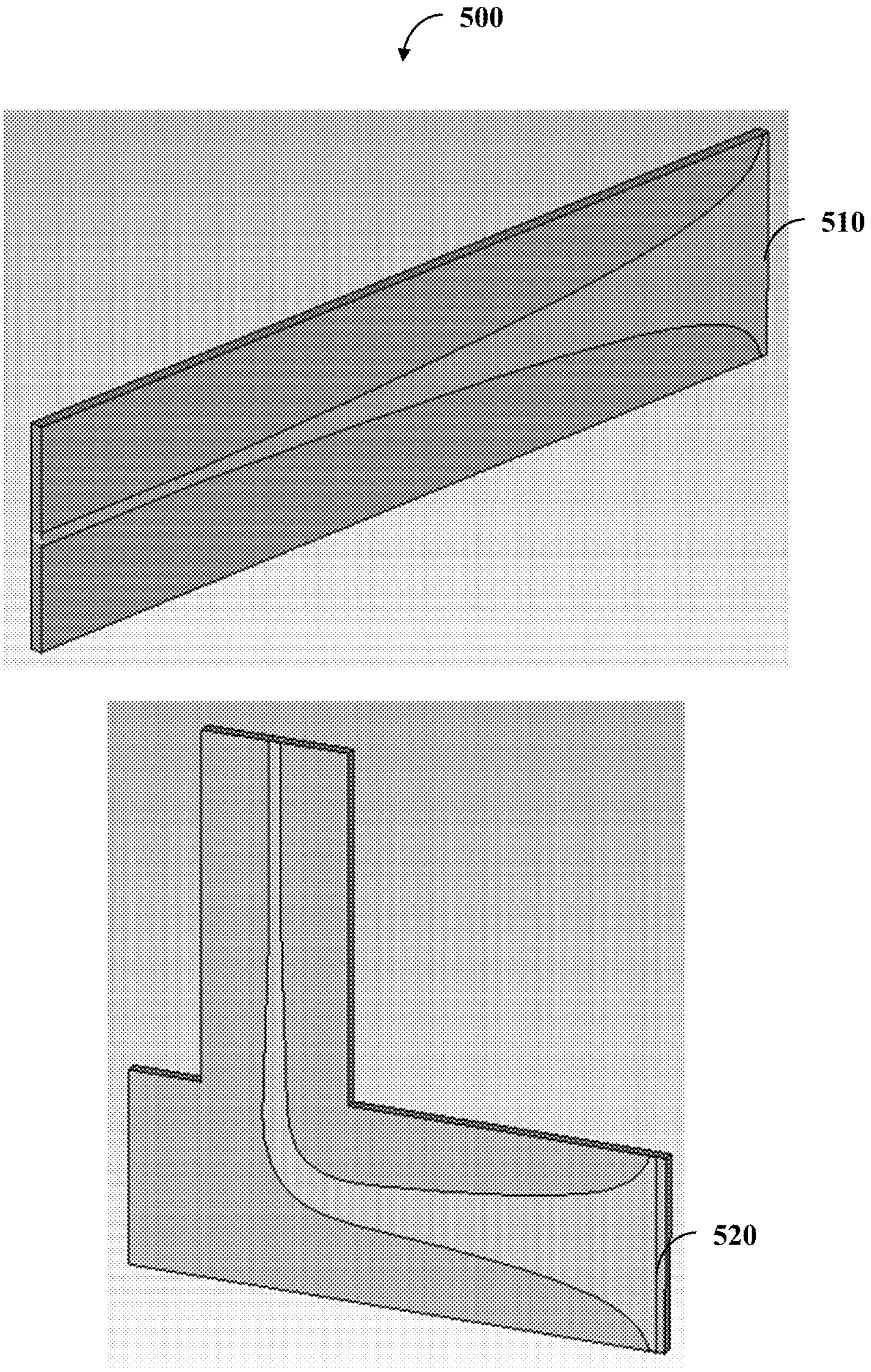
FIG. 5A illustrates one embodiment of a straight feed and a bent feed.
Figure 5B:
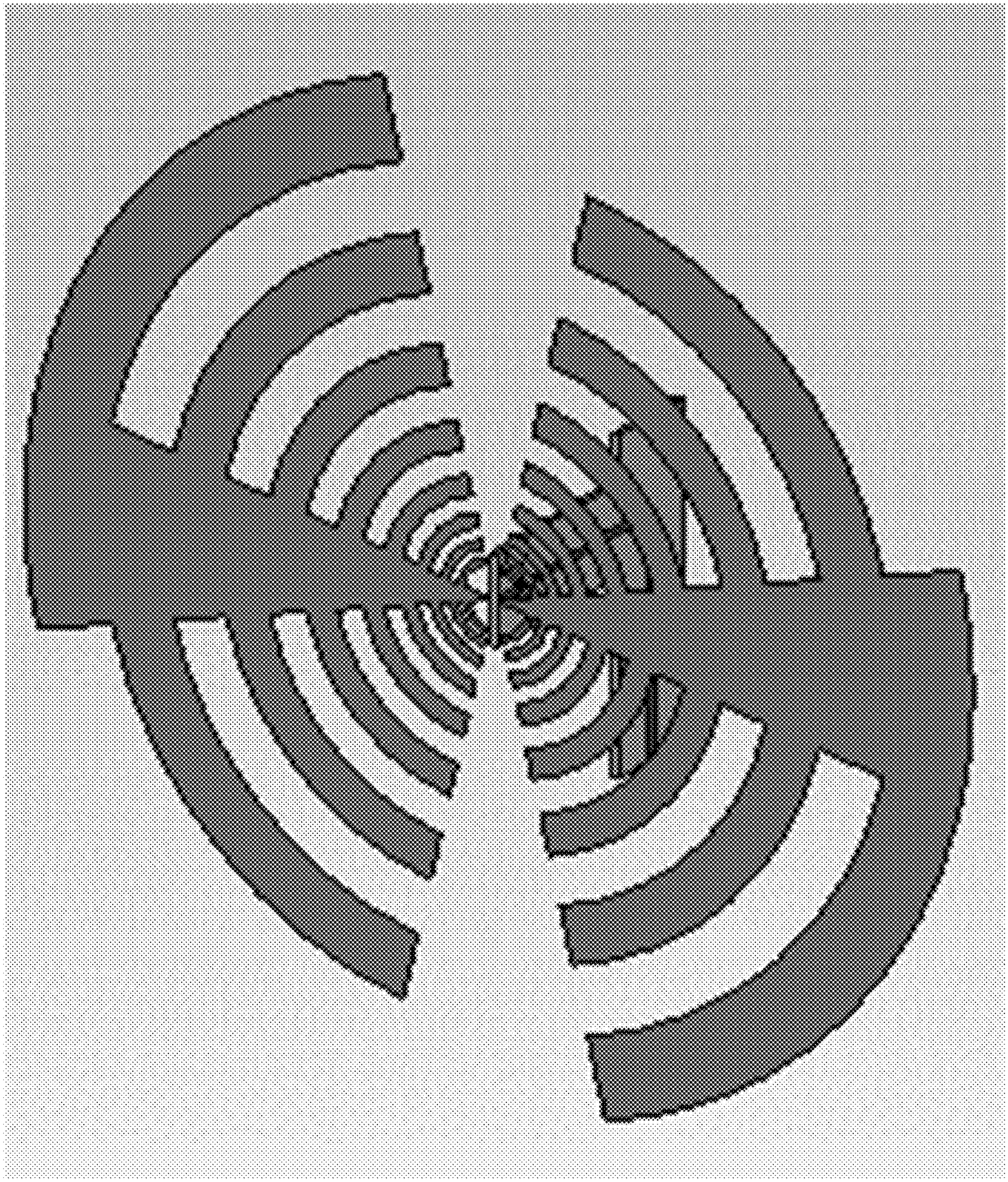
FIG. 5B illustrates one embodiment of a perspective view of the first antenna panel with the bent feed.

Note that with regard to FIGS. 1A-1C, these can collectively be referred to as "FIG. 1." Similarly, with regard to FIGS. 5A-5B, these can collectively be referred to as "FIG. 5."

DETAILED DESCRIPTION

Antenna panels (as the antenna radiation elements) can be designed with a mirrored approach and be made of a desired metallic material (e.g., a conducting material), such as copper. The mirrored approach can have the physical geometry such that the panels are a mirror of one another. The panels can operate out of phase of one another, such as 180 degrees out of phase. This can cause an antenna directivity improvement, hence a gain increasing to a higher value.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action (s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

FIG. 1A illustrates one embodiment of a system 100A comprising a first log-periodic antenna panel 110A and a second log-periodic antenna panel 120A. FIG. 1B illustrates one embodiment of a system 100B comprising a first log-periodic antenna panel with a first geometry 110B and a second log-periodic antenna panel with a second geometry 120B backed by a common ground plate 130. FIG. 1C illustrates one embodiment of an antenna panel 100C (e.g., the first log-periodic antenna panel 110A featuring the first geometry 110B) with a first arm 140A, a second arm 140B, a third arm 140C, and a fourth arm 140D.

The first log-periodic antenna panel 110A and the second log-periodic antenna panel 110B can be arranged along about the same plane next to one another. While being arranged along about the same plane, the second geometry 120B can be a mirror of the first geometry 110B.

In one example, as illustrated in the system 100B, the first geometry 110B and the second geometry 120B can have circular footprints. The first geometry 110B can be implemented as the antenna panel 100C with the four arms 140A, 140B, 140C, and 140D. The first geometry 110B can be split into four hemispheres, such as 0°-90° (first quadrant), 90°-180° (second quadrant), 180°-270° (third quadrant), and 270°-360°/0° (fourth quadrant). The first and second quadrants can form a first hemisphere and the third and fourth quadrants can form a second hemisphere.

The first geometry 110B can have the first arm 140A in the first quadrant extending beyond normalized 45 degrees (e.g., beyond 60 degrees), the second arm 140B in the second quadrant extending beyond normalized 45 degrees, the third arm 140C in the third quadrant extending beyond normalized 45 degrees, and the fourth arm 140D in the fourth quadrant extending beyond normalized 45 degrees. The hemispheres and quadrants can be configured to not overlap, making them separate and distinct.

Figure 2:
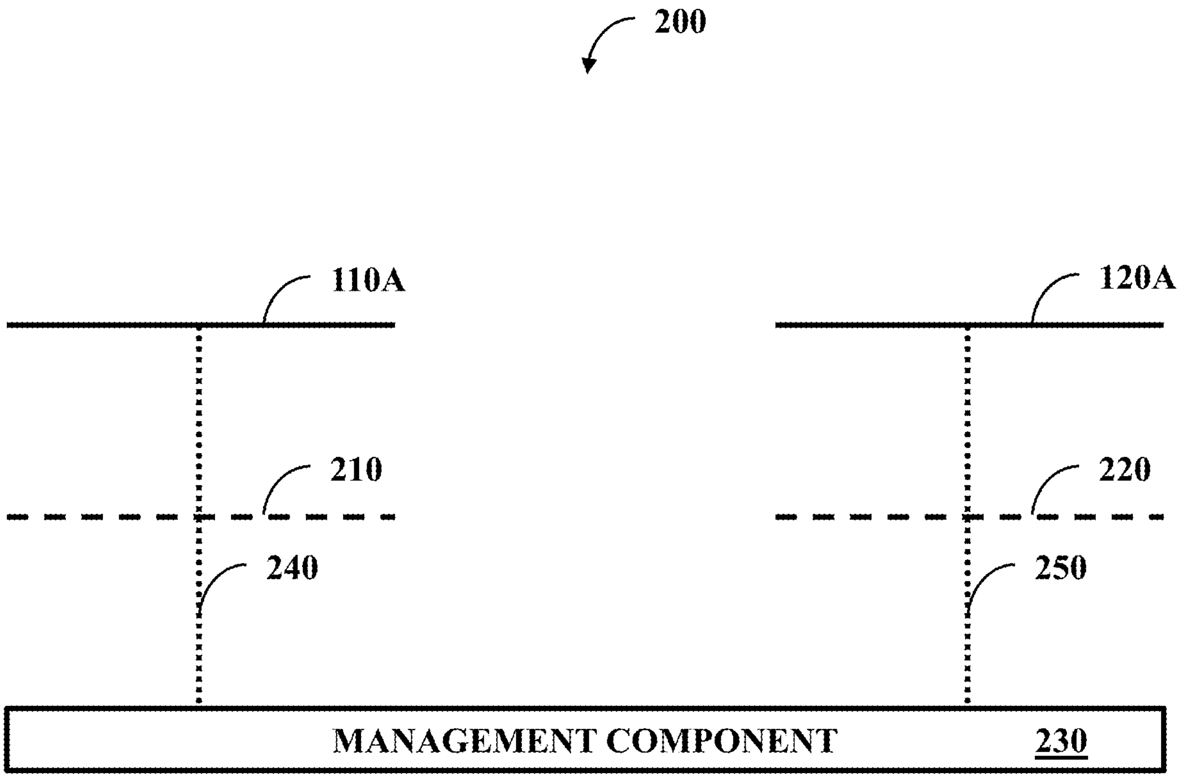
FIG. 2 illustrates one embodiment of a system comprising the first log-periodic antenna panel, the second log-periodic antenna panel, a first ground plate, a second ground plate, a management component, a first feed, and a second feed.

FIG. 2 illustrates one embodiment of a system 200 comprising the first log-periodic antenna panel 110, the second log-periodic antenna panel 120, a first ground plate 210, a second ground plate 220, a management component 230, a first feed 240, and a second feed 250. The first ground plate 210 and second ground plate 220 can form the common ground plate 130.

The first ground plate 210 can be coupled to the first log-periodic antenna panel 110A that causes the first log-periodic antenna panel 110A to be more directional. The second ground plate 220 can be coupled to the second log-periodic antenna panel 120A that causes the second log-periodic antenna panel 120A to be more directional. An isolated panel can have some aspect of directionality, so the ground plates 210 and 220 can cause the panels 110A and 120A to be more directional than absent the plates 210 and 220. In one example, the first ground plate 210 and the second ground plate 220 can be singular metal sheet. This sheet can stop radiation of the panels 110A and 120A in the direction of the metal sheet so a signal does not travel in that direction past the metal sheet.

The signal can be produced through excitement of the panels 110A and 120A. This excitement can occur through the first feed 240 coupled to the first log-periodic antenna panel 110A and the second feed 250 coupled to the second log-periodic antenna panel 120A.

The management component 230 can be configured to manage the first feed 240 to be at a normalized 0° and to manage the second feed 250 to be at a 180° offset from the first feed. In having the feeds offset and the mirrored geometry, the undesired cross-polarization gain can be down to the minimum value on the boresight direction.

Figure 3:
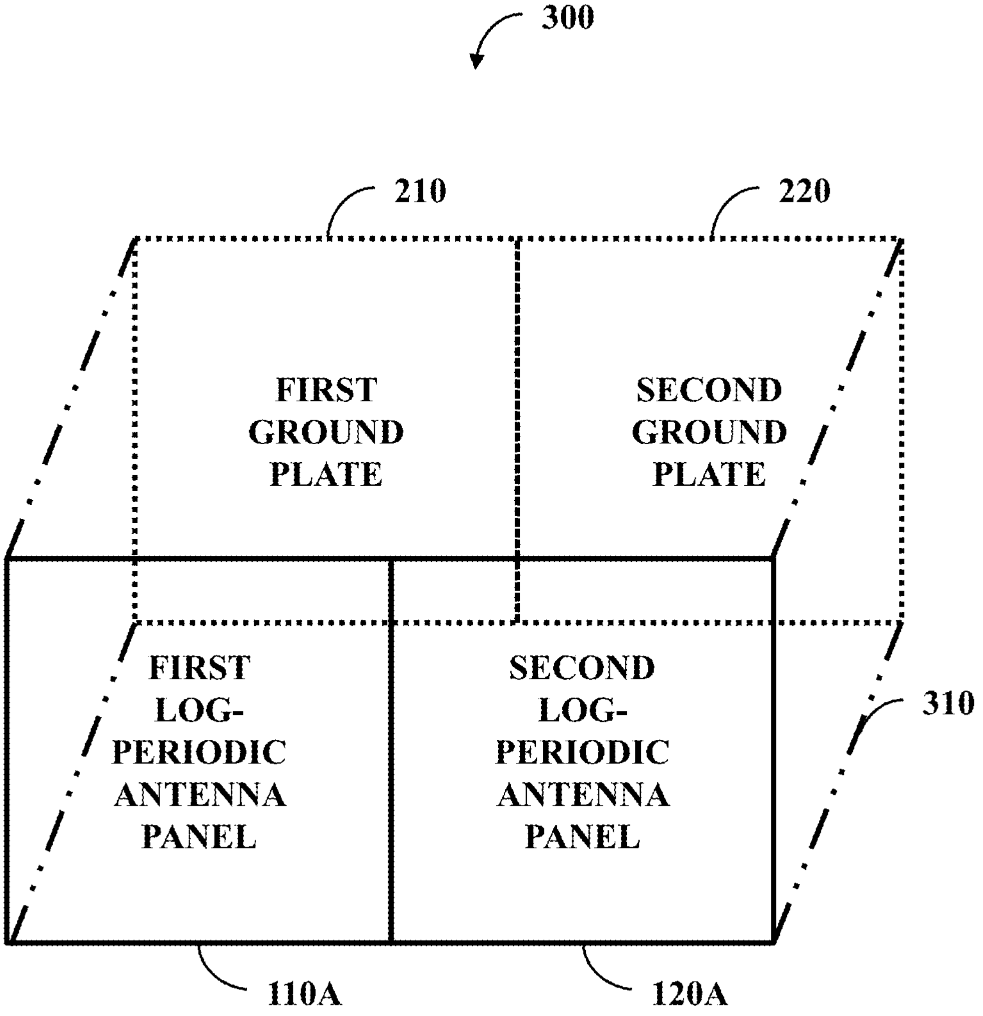
FIG. 3 illustrates one embodiment of a system comprising the first log-periodic antenna panel, the second log-periodic antenna panel, the first ground plate, the second ground plate, and a wall.

FIG. 3 illustrates one embodiment of a system 300 comprising the first log-periodic antenna panel 110, the second log-periodic antenna panel 120, the first ground plate 210, the second ground plate 220, and a wall 310. The wall 310 can be situated between the antenna panels 110A-120A and the ground plates 210-220 to form a cavity. The wall 310 can cause the cavity to be enclosed or partially open. The wall 310 can provide structural support to hold the panels 110A-120A at a distance from the ground plates 210-220. The wall 310 can be made of a non-metallic material to provide mechanical support or be made of a metallic material to provide mechanical support and improve functionality (e.g., improved boresight gain and/or less radiation on transverse and backside).

Figure 4:
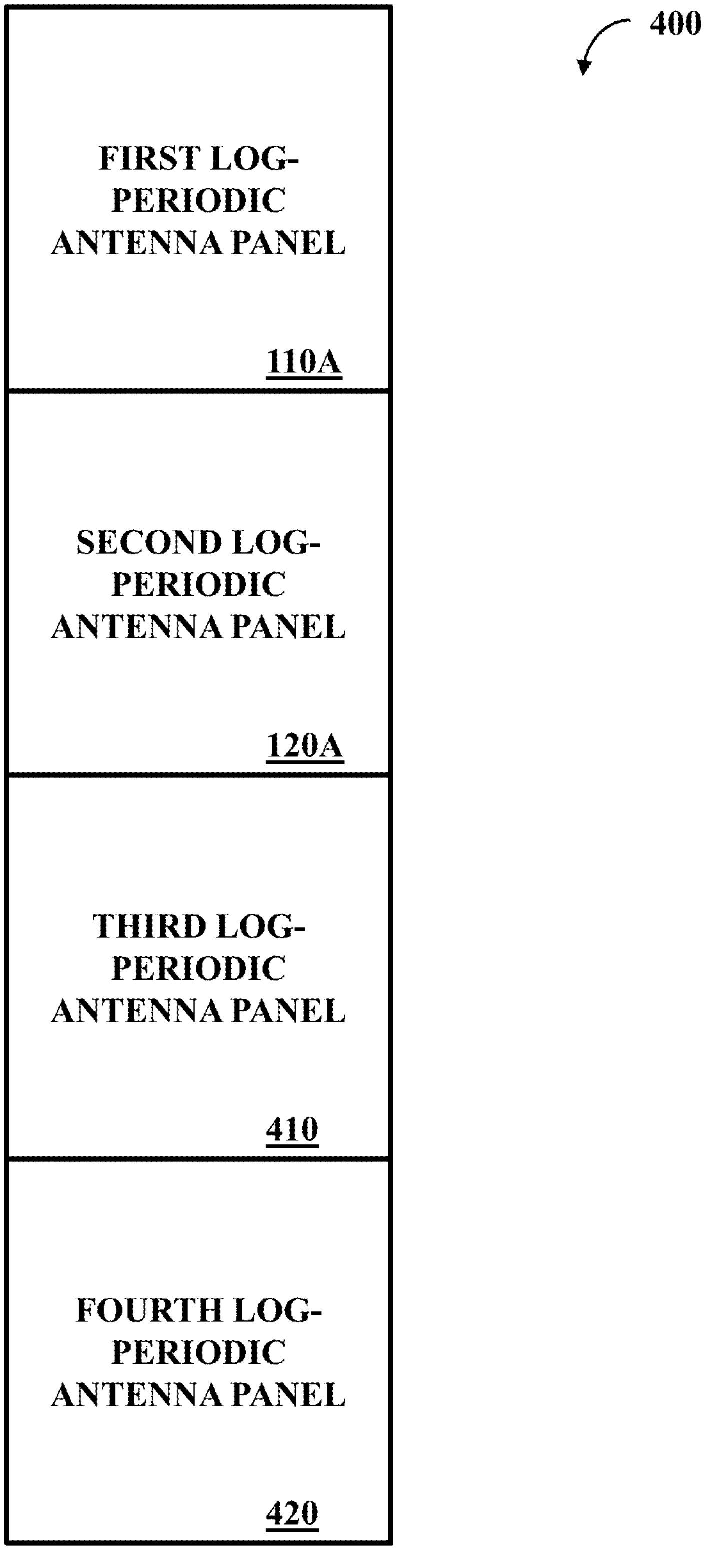
FIG. 4 illustrates one embodiment of a system comprising the first log-periodic antenna panel, the second log-periodic antenna panel, a third log-periodic antenna panel, and a fourth log-periodic antenna panel.

FIG. 4 illustrates one embodiment of a system 400 comprising the first log-periodic antenna panel 110, the second log-periodic antenna panel 120, a third log-periodic antenna panel 410, and a fourth log-periodic antenna panel 420. While two panels 110A and 120A are illustrated in FIG. 1, other configurations can be practiced.

In one example, the third log-periodic antenna panel 410 can be employed, such as with the first geometry or a third geometry. In another example, the fourth log-periodic antenna panel 420 can be employed along with the third log-periodic antenna panel 410. The fourth log-periodic antenna panel 420 can be configured with various geometries, such as the second geometry or a fourth geometry. The four panels 110A-120A and 410-420 can be along the same plane, such as the third panel 410 and fourth panel 420 being next to one another and the second panel 120A and third panel 410 being next to one another.

While four panels are illustrated, other configurations can be employed. In one example, three panels can be employed: two with one geometry and one with a different geometry. Other aspects disclosed herein can be precited with a non-two pane configuration, such as three panels forming a cavity or the management component 250 managing excitement of four panels (e.g., two at 0° and two at 180° or one at 0°, one at 90°, one at 180°, and one at 270°).

FIG. 5A illustrates one embodiment of a straight feed 510 and a bent feed 520. FIG. 5B illustrates one embodiment of a perspective view 530 of the first antenna panel 110A with the bent feed 520 (reference numbers 110A and 520 not illustrated in photo in view of difficult reference access to the bent feed 520).

The straight feed 510 and the bent feed 520 can be different implementations of the feeds 240 and 250. For example, the first feed 240 can connect to the first log-periodic antenna panel 110A at a first angle of about 90 degrees and the second feed 250 can connect to the second log-periodic antenna panel 120A at a second angle of about 90 degrees (e.g., the first angle and the second angle are the same angle or different angles).

Figure 6:
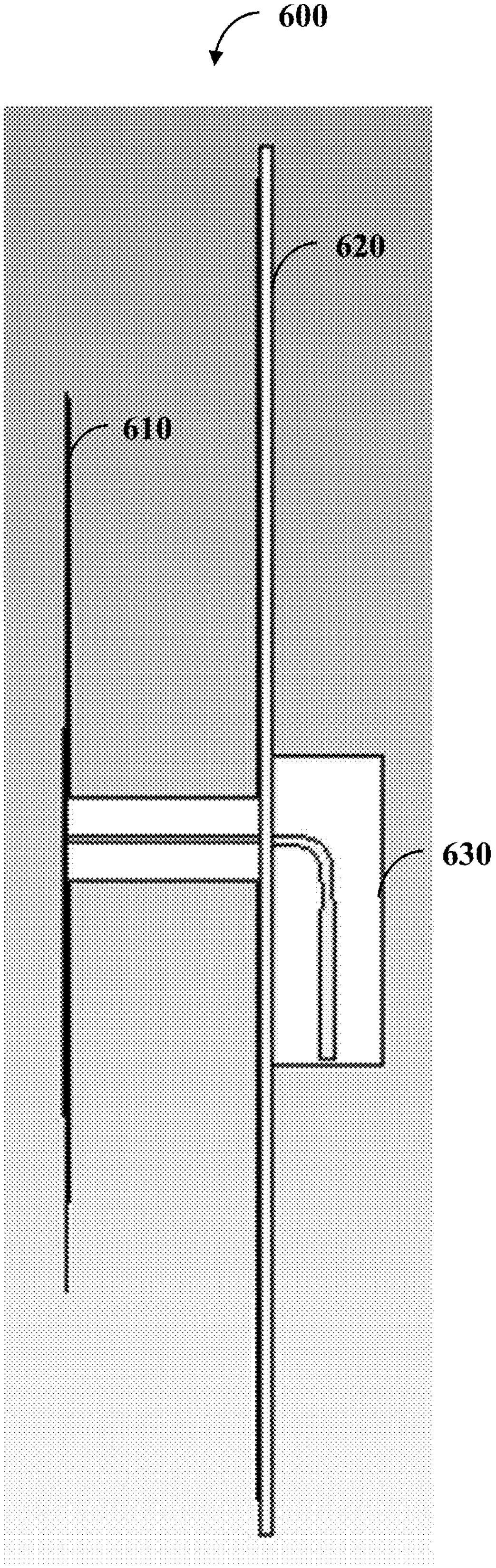
FIG. 6 illustrates one embodiment of an antenna profile view.

FIG. 6 illustrates one embodiment of an antenna profile view 600. Two planes are illustrated: a first plane 610 and a second plane 620. The panels 110A and 120A can align along the first plane and the ground plates 210 and 220 can align along the second plane 620. Additionally, a feed plane 630 allows the feeds 240 and 250 to be aligned, such as bent feeds 520.

Figure 7:
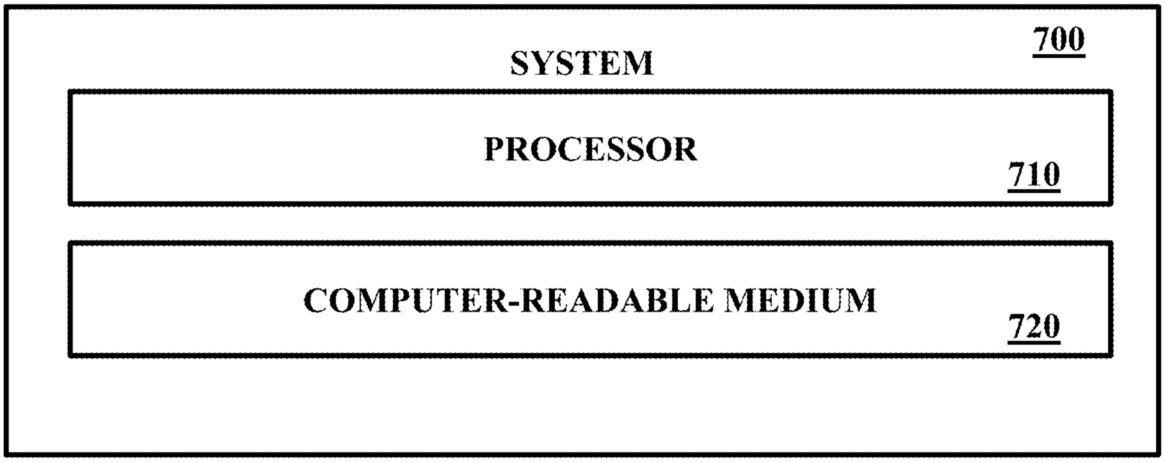
FIG. 7 illustrates one embodiment of a system comprising a processor and a computer-readable medium.

FIG. 7 illustrates one embodiment of a system 700 comprising a processor 710 (e.g., a general purpose processor, a processor specifically designed for performing a functionality disclosed herein, etc.) and a computer-readable medium 720 (e.g., non-transitory computer-readable medium). In one embodiment, the computer-readable medium 720 is communicatively coupled to the processor 710 and stores a command set executable by the processor 710 to facilitate operation of at least one component disclosed herein (e.g., the management component 230). In one embodiment, at least one component disclosed herein (e.g., the management component 230) can be implemented, at least in part, by way of non-software, such as implemented as hardware by way of the system 700. In one embodiment, the computer-readable medium 720 is configured to store processor-executable instructions that when executed by the processor 710, cause the processor 710 to perform a method disclosed herein (e.g., the method 800 addressed below).

Figure 8:
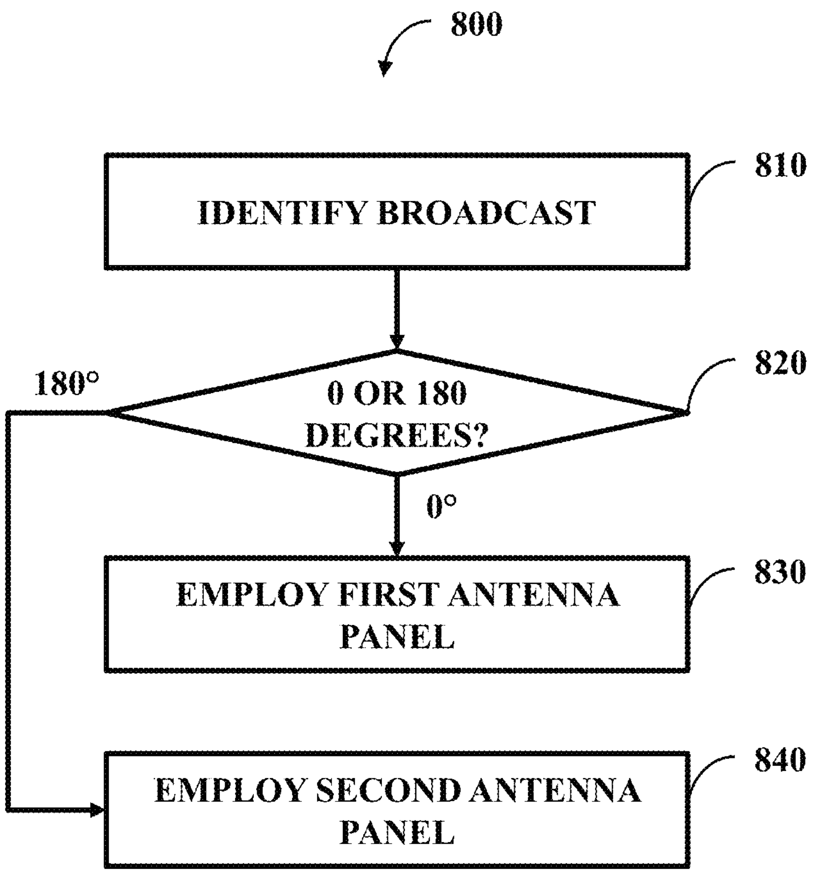
FIG. 8 illustrates one embodiment of a method comprising four actions.

FIG. 8 illustrates one embodiment of a method 800 comprising four actions 810-840. At 810, identification on a broadcast to take place can occur, such as by the management component 250. At 820, a check can occur on if the broadcast should begin at 0° or 180°. If the broadcast should begin at 0°, then the method 800 can employ the first antenna panel 110A at 830; if the broadcast should begin at 180°, then the method 800 can employ the second antenna panel 110A at 840. Actions 830 and 840 can alternate after initial employment.

Figure 9:
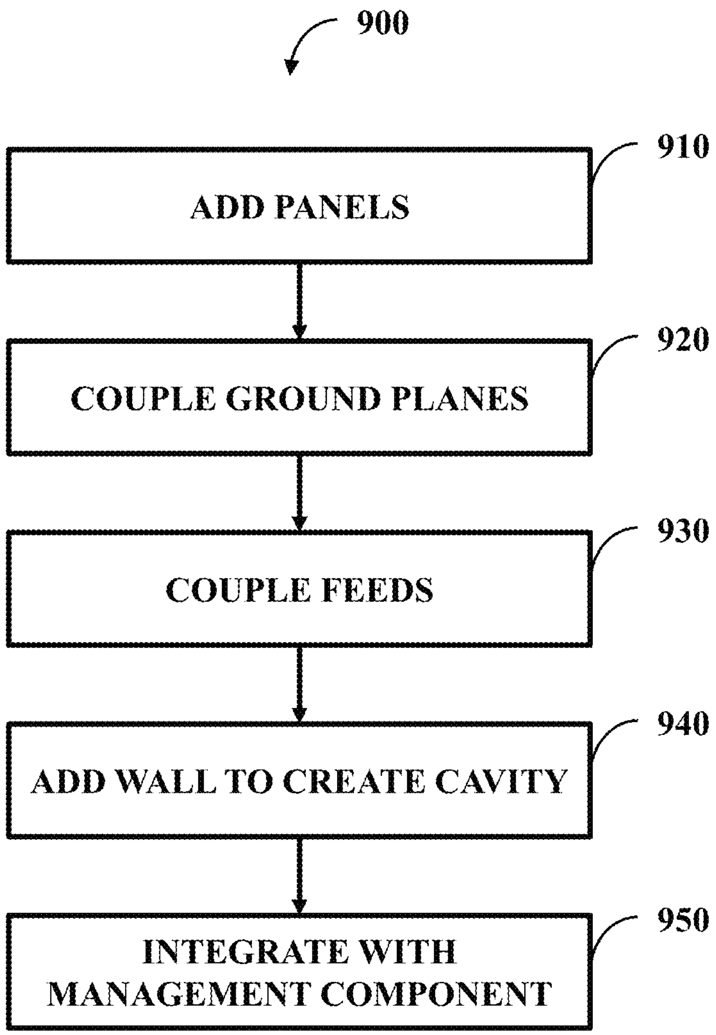
FIG. 9 illustrates one embodiment of a method comprising four actions.

FIG. 9 illustrates one embodiment of a method 900 comprising four actions 910-940; the method 900 can be a method of manufacture for a system consistent with aspects disclosed herein. At 910, the first log-periodic antenna panel 110A with a first geometry 110B (e.g., with a circular footprint) and the second log-periodic antenna panel 120A with a second geometry 120B (e.g., with a circular footprint mirroring the first geometry 110B) can be placed next to one another along the same plane. At 920, the first ground plate 210 can be coupled to the first log-periodic antenna panel 110A that causes the first log-periodic antenna panel 110A to be directional and the second ground plate 210 can be coupled to the second log-periodic antenna panel 120A that causes the second log-periodic antenna panel 120A to be directional. At 930, the first feed 240 can be coupled to the first log-periodic antenna panel 110A (e.g., at an about 90° angle) and the second feed 240 can be coupled to the second log-periodic antenna panel 120A (e.g., at an about 90° angle). At 940, the wall 310 can be disposed between the antenna panel set (e.g., the first panel 110A and the second panel 120A) and the ground plate set (e.g., the first ground plate 210 and the second ground plate 220) to form the cavity. At 950, the management component 230 can be integrated so that it is configured to manage the first feed 240 to be at a normalized 0° and to manage the second feed 250 to be at a 180° offset from the first feed 240 (e.g., run the method 800).

Figure 10:
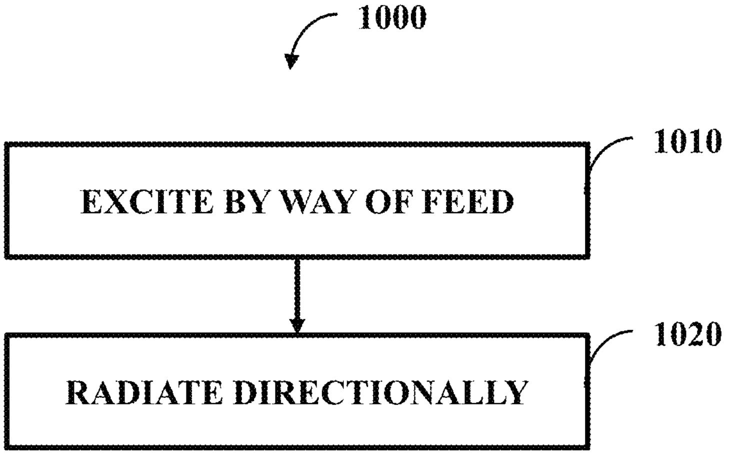
FIG. 10 illustrates one embodiment of a method comprising two actions.

FIG. 10 illustrates one embodiment of a method 1000 comprising two actions 1010-1020. At 1010, the panels 110A and 120A can be excited by way of the feeds 240 and 250. In response to the excitement, the panels 110A and 120B can radiate directionally at 1020, such as a result of the ground plates 210 and 220.

The panels 110A and 110B and other aspects disclosed herein can be employed in the field of electromagnetics, radio frequency engineering, and antenna deign. This can result in achievement of a wide-frequency band Log-Periodic antenna (e.g., a system comprising the panes 110A and 110B) with high/symmetrical far-field gain patterns using a metallic ground plane (e.g., ground plates 210 and 220) on their back. Aspects disclosed herein can be employed in design wide frequency band antennas using ground plane backed frequency independent antennas, Log-periodic antennas, as well as spiral antennas of varying size, shape, and layering. The wide frequency band Log-Periodic Antenna can be used as an antenna element that is part of an antenna array system or directly used in a large or small antenna array. Aspects disclosed herein can be used to achieve linear vertical polarized (VP), linear horizontal polarized (HP), Right Hand Circularly (RHCP), Polarized, Left Hand Circularly Polarized (LHCP), or a combination of two or more combined polarizations.

Aspects disclosed herein can allow for a wide frequency band log-periodic antenna on a metallic ground plane with a parallel balanced input port (e.g., non 50-ohm) converted to un-balanced 50-ohm (e.g., to be fed to the next level of Radio Frequency (RF) chain or be combined to compose an antenna array) as a single antenna element with a high antenna gain/directivity across the wide frequency band. In addition, feeding can make the antenna array (e.g., with two or more antenna elements, such as the panels 110A and 110B) to achieve high gain/directivity and symmetrical antenna far-field radiation patterns for improved (e.g., maximum) Co-Pol and improved (e.g., minimum or about zero) low level X-Pol.

This can be advantageous in that Log-Periodic antenna configurations with metallic ground plane can have a wide operation frequency band and high antenna gain/directivity. This can be additionally advantageous in that a low side and/or back radiation can be achieved with desirable (e.g., minimum) side and/or back radiation while being conformable. This can be further advantageous in that that it can give desirable (e.g., peak) gain at boresight with VP, HP, RHCP, or/and LHCP polarization.

Frequency independent antennas, such as an antenna built in accordance with aspects disclosed herein, can be antennas whose radiation pattern, RF input impedance and electrical field polarization remain unchanged over a wide frequency bandwidth. There are several configurations that can be employed, such as equiangular, sinuous and Archimedean. A log-periodic antenna panel with a backed ground plane can be used as a wide frequency band antenna and possess high one-side antenna gain/directivity. A log-periodic antenna panel can be used in an array formation in order to increase radiation beam directivity. The log-periodic antenna can be designed with backed ground plane (e.g., the first and second ground plates 210 and 220 as a singular ground plate), balanced-to-unbalanced mode/impedance transformer, and the feeding method of the antenna array which has combined desirable (e.g., maximum) radiation beam on one side with co-polarized (Co-Pol) desirable (e.g., maximum) gain, at least partially canceled cross-polarization (X-Pol), and about symmetrical antenna far-field gain patterns.

The Log-periodic antenna element can be backed with the common ground plate as a flat metallic surface with or without the wall 310 to become a cavity. The cavity can be a common cavity for panels 110A and 120A or have a separator such that two cavities are formed for the individual panels 110A and 120A. This can reduce RF radiation in the transverse direction, hence obtain more radiation energy to the desired front direction antenna gain. Similarly, the ground plate outline profiles can be in different shapes, such as rectangular, circular, etc. and not necessarily match the shape of the antenna panel 110A or 120A.

A balanced-unbalanced mode/impedance transfer board can be the implementation of aspects disclose herein. This board can transfer/convert a balanced mode with about 200~300 ohms impedance to unbalanced microstrip line mode with about 50 ohms.

A very high X-Pol gains (e.g., in the boresight direction which is at 0°) Can result without mirroring the geometries. In employing mirroring, as illustrated by geometries 110B and 120B in reference to one another, very low X-Pol gains (e.g., in the boresight direction which is at 0°) Can be achieved, due to opposite element orientation layout of the two antenna panels 110B and 110A (e.g., antenna elements). In view of the opposite orientated geometries, the 180° phase difference can be employed.

The two-element orientation can be maintained for improved (e.g., maximum) Co-Pol gain to the boresight direction. While mirroring is discussed, other aspects can be practiced. In one example, the second geometry 120B can be laid at a 90° rotation from the first geometry 120A, so the first geometry and the second geometry do not match in orientation yet are not mirrored.

While the methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block.

What is claimed is:

1. A system, comprising:

a first log-periodic antenna panel with a first geometry; and a second log-periodic antenna panel with a second geometry, where the first log-periodic antenna panel and the second log-periodic antenna panel are arranged along about the same plane next to one another and where the first geometry and the second geometry are different in orientation.

2. The system of claim 1, comprising:

a first ground plate coupled to the first log-periodic antenna panel that causes the first log-periodic antenna panel to be more directional; and a second ground plate coupled to the second log-periodic antenna panel that causes the second log-periodic antenna panel to be more directional.

3. The system of claim 2, comprising:

a wall, where the first log-periodic antenna panel and the second log-periodic antenna panel form an antenna panel set, where the first ground plate and the second ground plate form a ground plate set, and where the wall is disposed between the antenna panel set and the ground plate set to form a cavity.

4. The system of claim 1, comprising:

a first feed coupled to the first log-periodic antenna panel;

a second feed coupled to the second log-periodic antenna panel;

a management component configured to manage the first feed to be at a normalized 0 degrees when exciting the first log-periodic antenna panel and to manage the second feed to be at a 180 degree offset from the first feed when exciting the second log-periodic antenna panel.

5. The system of claim 4, where the first feed connects to the first log-periodic antenna panel at a first angle of about 90 degrees and where the second feed connects to the second log-periodic antenna panel at a second angle of about 90 degrees.

6. The system of claim 1, where the second geometry is a mirror of the first geometry, where the first geometry has a circular footprint and where the second geometry has a circular footprint.

7. The system of claim 6, where the first geometry has a first arm in a first hemisphere extending beyond normalized 45 degrees, where the first geometry has a second arm in the first hemisphere extending beyond normalized 45 degrees, where the first arm is in a first quadrant of the first hemisphere, where the second arm is in a second quadrant of the first hemisphere, where the first quadrant of the first hemisphere and the second quadrant of the first hemisphere are independent and distinct of one another, where the first geometry has a third arm in a second hemisphere extending beyond normalized 45 degrees, where the first geometry has a fourth arm in the second hemisphere extending beyond normalized 45 degrees, where the third arm is in a third quadrant of the second hemisphere, where the fourth arm is in a fourth quadrant of the fourth hemisphere,
where the third quadrant of the second hemisphere and the fourth quadrant of the second hemisphere are independent and distinct of one another, and
where the first hemisphere and the second hemisphere are independent and distinct of one another.

8. The system of claim 1, comprising:
a third log-periodic antenna panel with the first geometry; and
a fourth log-periodic antenna panel with the second geometry,
where the third log-periodic antenna panel and the fourth log-periodic antenna panel are arranged along about the same plane next to one another and
where the second log-periodic antenna panel and the third log-periodic antenna panel are arranged along about the same plane next to one another.

9. A system, comprising:
a first log-periodic antenna panel with a first geometry;
a second log-periodic antenna panel with a second geometry;
a first ground plate coupled to the first log-periodic antenna panel that causes the first log-periodic antenna panel to be more directional;
a second ground plate coupled to the second log-periodic antenna panel that causes the second log-periodic antenna panel to be more directional;
a first feed coupled to the first log-periodic antenna panel;
a second feed coupled to the second log-periodic antenna panel; and
a management component configured to manage the first feed to be at a normalized 0 degrees and to manage the second feed to be at a 180 degree offset from the first feed,
where the first log-periodic antenna panel and the second log-periodic antenna panel are arranged along about the same plane next to one another and
where the first geometry and the second geometry do not match in orientation.

10. The system of claim 9,
where the second geometry is a mirror of the first geometry,
where the first geometry's footprint is circular, and
where the second geometry's footprint is circular.

11. The system of claim 10,
where the first geometry has a first arm in a first hemisphere extending beyond normalized 45 degrees,
where the first geometry has a second arm in the first hemisphere extending beyond normalized 45 degrees,
where the first arm is in a first quadrant of the first hemisphere,
where the second arm is in a second quadrant of the first hemisphere,
where the first quadrant of the first hemisphere and the second quadrant of the first hemisphere are independent and distinct of one another,
where the first geometry has a third arm in a second hemisphere extending beyond normalized 45 degrees,
where the first geometry has a fourth arm in the second hemisphere extending beyond normalized 45 degrees,
where the third arm is in a third quadrant of the second hemisphere,
where the fourth arm is in a fourth quadrant of the fourth hemisphere, where the third quadrant of the second hemisphere and the fourth quadrant of the second hemisphere are independent and distinct of one another, and
where the first hemisphere and the second hemisphere are independent and distinct of one another.

12. The system of claim 11,
where the first feed connects to the first log-periodic antenna panel at an about 90 degree angle and
where the second feed connects to the second log-periodic antenna panel at an about 90 degree angle.

13. The system of claim 12, comprising:
a wall,
where the first log-periodic antenna panel and the second log-periodic antenna panel form an antenna panel set,
where the first ground plate and the second ground plate form a ground plate set, and
where the wall is disposed between the antenna panel set and the ground plate set to form a cavity.

14. The system of claim 9, comprising:
a wall,
where the first log-periodic antenna panel and the second log-periodic antenna panel form an antenna panel set,
where the first ground plate and the second ground plate form a ground plate set, and
where the wall is disposed between the antenna panel set and the ground plate set to form a cavity.

15. The system of claim 9,
where the first feed connects to the first log-periodic antenna panel at an about 90 degree angle and
where the second feed connects to the second log-periodic antenna panel at an about 90 degree angle.

16. The system of claim 9, comprising:
a third log-periodic antenna panel with the first geometry;
a fourth log-periodic antenna panel with the second geometry;
a third ground plate coupled to the third log-periodic antenna panel that causes the third log-periodic antenna panel to be more directional;
a fourth ground plate coupled to the fourth log-periodic antenna panel that causes the fourth log-periodic antenna panel to be more directional;
a third feed coupled to the third log-periodic antenna panel; and
a fourth feed coupled to the fourth log-periodic antenna panel,
where the third log-periodic antenna panel and the fourth log-periodic antenna panel are arranged along about the same plane next to one another and
where the second log-periodic antenna panel and the third log-periodic antenna panel are arranged along about the same plane next to one another.

17. The system of claim 14,
where the first log-periodic antenna panel has a first circular footprint geometry,
where the second log-periodic antenna panel has a second circular footprint geometry,
where the third log-periodic antenna panel has a third circular footprint geometry,
where the fourth log-periodic antenna panel has a fourth first circular footprint geometry,
where the first feed connects to the first log-periodic antenna panel at an about 90 degree angle,
where the second feed connects to the second log-periodic antenna panel at an about 90 degree angle,
where the third feed connects to the third log-periodic antenna panel at an about 90 degree angle, where the fourth feed connects to the fourth log-periodic antenna panel at an about 90 degree angle.

18. The system of claim 15, comprising:

a wall between the antenna panels and the ground plates to form a cavity.

19. A system, comprising:

a first log-periodic antenna panel with a first geometry;

a second log-periodic antenna panel with a second geometry;

a first ground plate coupled to the first log-periodic antenna panel that causes the first log-periodic antenna panel to be more directional;

a second ground plate coupled to the second log-periodic antenna panel that causes the second log-periodic antenna panel to be more directional;

a first feed coupled to the first log-periodic antenna panel;

a second feed coupled to the second log-periodic antenna panel;

a management component configured to manage the first feed to be at a normalized 0 degrees and to manage the second feed to be at a 180 degree offset from the first feed; and a wall, where the first log-periodic antenna panel and the second log-periodic antenna panel form an antenna panel set, where the first ground plate and the second ground plate form a ground plate set, where the wall is disposed between the antenna panel set and the ground plate set to form a cavity, where the first log-periodic antenna panel and the second log-periodic antenna panel are arranged along about the same plane next to one another, where the second geometry is a mirror of the first geometry, where the first geometry's footprint is circular, and where the second geometry's footprint is circular.

20. The system of claim 19, where the first feed connects to the first log-periodic antenna panel at an about 90 degree angle, where the second feed connects to the second log-periodic antenna panel at an about 90 degree angle, where the first geometry has a first arm in a first hemisphere extending beyond normalized 45 degrees, where the first geometry has a second arm in the first hemisphere extending beyond normalized 45 degrees, where the first arm is in a first quadrant of the first hemisphere, where the second arm is in a second quadrant of the first hemisphere, where the first quadrant of the first hemisphere and the second quadrant of the first hemisphere are independent and distinct of one another, where the first geometry has a third arm in a second hemisphere extending beyond normalized 45 degrees, where the first geometry has a fourth arm in the second hemisphere extending beyond normalized 45 degrees, where the third arm is in a third quadrant of the second hemisphere, where the fourth arm is in a fourth quadrant of the fourth hemisphere, where the third quadrant of the second hemisphere and the fourth quadrant of the second hemisphere are independent and distinct of one another, and where the first hemisphere and the second hemisphere are independent and distinct of one another.

* * * * *